United States Patent [19]

Veronesi et al.

[11] Patent Number: 4,902,468
[45] Date of Patent: Feb. 20, 1990

[54] CONTROL ROD SUPPORT HAVING PLANAR WEAR SURFACES

[75] Inventors: Luciano Veronesi, O'Hara Twp., Allegheny County; Larry A. Shockling, Plum Boro, both of Pa.

[73] Assignee: Westinghouse Electric Corp., Pittsburgh, Pa.

[21] Appl. No.: 110,985

[22] Filed: Oct. 21, 1987

[51] Int. Cl.⁴ .................. G21C 7/00; G21C 19/00
[52] U.S. Cl. ................................ 376/327; 376/353
[58] Field of Search ............................ 376/353, 327

[56] References Cited

U.S. PATENT DOCUMENTS

| | | |
|---|---|---|
| 2,805,049 | 9/1957 | Katholi . |
| 3,176,762 | 4/1965 | Greenwood et al. . |
| 3,481,832 | 12/1969 | Rickert .................. 376/353 |
| 3,589,438 | 6/1971 | Boorman . |
| 3,804,354 | 4/1974 | Weiss . |
| 3,849,257 | 11/1974 | Bevilacqua ................ 376/353 |
| 4,056,441 | 11/1977 | Marmonier et al. . |
| 4,120,350 | 10/1978 | Norton . |
| 4,156,299 | 5/1979 | Kovac . |
| 4,160,477 | 7/1979 | Roffler . |
| 4,204,305 | 5/1980 | Norton . |
| 4,231,843 | 11/1980 | Myron et al. .............. 176/50 |
| 4,284,475 | 8/1981 | Anthony ................. 176/78 |
| 4,285,396 | 8/1981 | Schwoerer et al. . |
| 4,313,796 | 2/1982 | Buettiker .................. 376/353 |
| 4,326,921 | 4/1982 | Cadwell .................... 376/353 |
| 4,433,721 | 2/1984 | Biaggi . |
| 4,562,038 | 12/1985 | Assedo et al. ............. 376/353 |
| 4,584,168 | 4/1986 | Formanek .................. 376/353 |

FOREIGN PATENT DOCUMENTS

| | | |
|---|---|---|
| 0078728 | 11/1983 | European Pat. Off. . |
| 1814297 | 12/1968 | Fed. Rep. of Germany . |
| 2086289 | 4/1971 | France . |
| 2249403 | 10/1973 | France . |

*Primary Examiner*—Harvey E. Behrend

[57] ABSTRACT

A control rod support for mounting within a rod guide of a pressure vessel has plural, parallel axial extending passageway openings therein for receiving corresponding control rods of a control rod cluster. A channel extends from the passageway opening and through the support for accommodating each vane of a spider which supports the control rods and provides for telescoping movement of the control rod cluster relative to the rod guide and associated guide rod supports. Spaced interior side walls of the support defining the channel form junctures with the interior side wall defining the passageway opening; and planar wear surfaces extend from the respective junctures of the channel-defining interior side walls a sufficient lateral distance to provide planar-to-convex wear surface interfaces with the corresponding, contiguous surface segments of a generally cylindrical control rod which is received through the passageway opening and urged against the junctures.

16 Claims, 5 Drawing Sheets

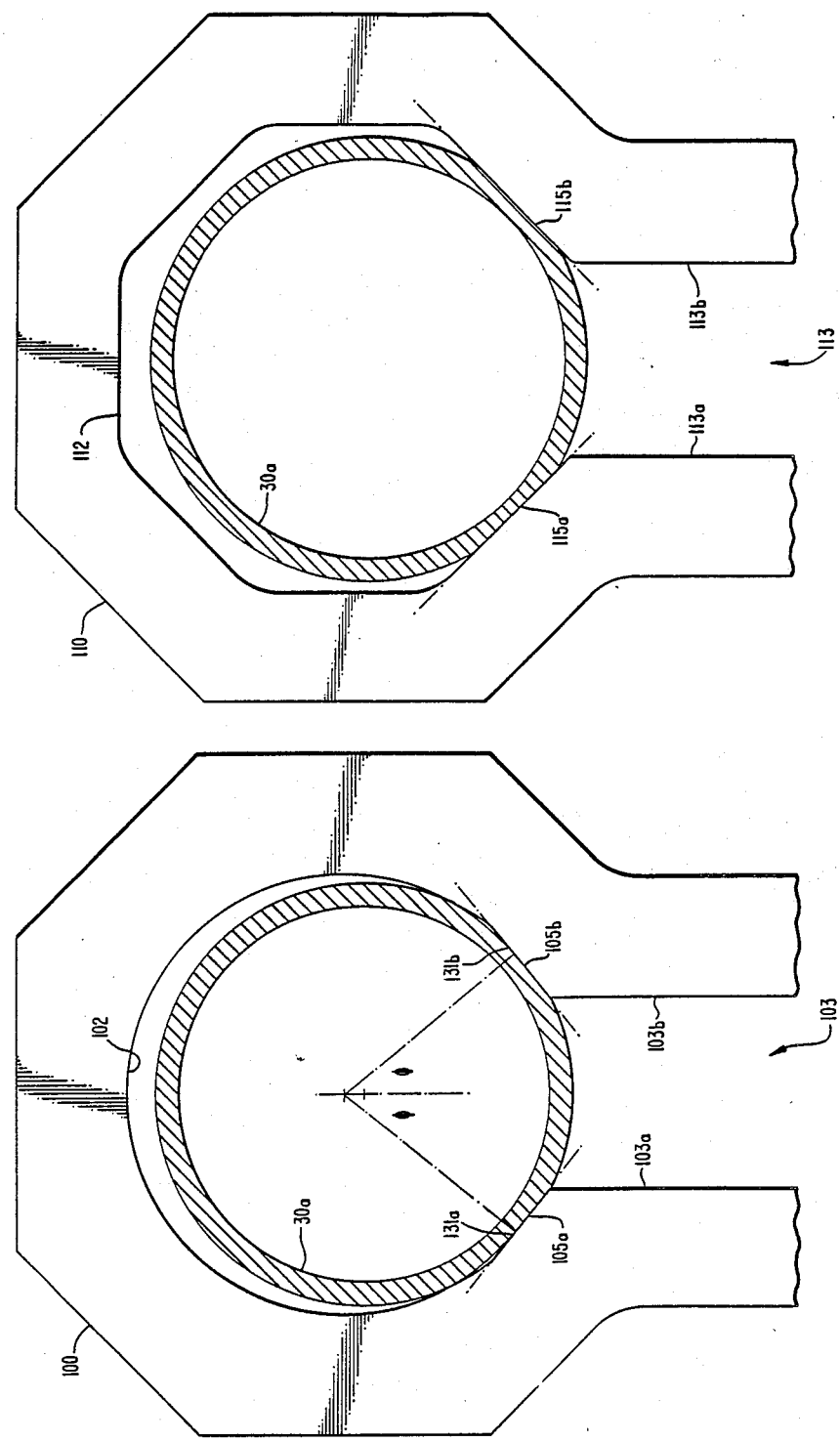

CONTROL ROD SUPPORT HAVING PLANAR WEAR SURFACES

BACKGROUND OF THE INVENTION

1. Field of the Invention

This invention relates to pressurized water reactors and, more particularly, to an improved control rod support in the rod guides for control rod clusters having planar wear surfaces for reducing wear depth and increasing the operational life of the control rods.

2. State of the Prior Art

Nuclear reactors employ plural clusters of control rods, each of which is generally of elongated cylindrical configuration, and which clusters are disposed for parallel axial, telescoping movement into and out of the reactor core for moderating and thereby controlling the level of activity in accordance with power demands. The plural rods of each cluster are interconnected at their top ends by a so-called spider, the spider having a central hub and radially extending vanes, or arms, which interconnect mounting elements to the hub, an upper end of each control rod being secured within a corresponding mounting element. Typically, each cluster of control rods is received within a respective rod guide, the rod guide having an outer configuration in cross-section corresponding to that of the array of control rods of the associated cluster. The guide typically is of thin metal and has disposed at periodic spacings therewithin, e.g., 30 inches, a plurality of rod guide supports. Each rod guide support is secured about its outer periphery to the interior surface of the side wall of the rod guide. The supports have passageway openings and channels, or slots, aligned with the corresponding rods and spider vanes, sized somewhat larger than the cross-sectional area of the associated control rods, so as to permit the telescoping, relative movement therebetween.

During operation, the control rods are periodically moved, for the reasons noted, at a time when there are lateral loads induced between the rod and the support. This combination of movement and load is known to cause wear of the control rods along their surfaces which rest against the support, and the support as well. The configuration results in a wear scar in the rod that often exhibits a characteristic wedge-shaped cross-section, which may be deep relative to the cross-sectional area of the scar. A significant design parameter with regard to the life of a control rod is the minimum wall thickness of the rod that must be maintained. Since the initial wall thickness is partially determined by factors such as the required geometry and desired stiffness, the cross-sectional wear scar shape, and its corresponding wear depth, becomes a determining factor with regard to the allowable operational life of the control rod.

In analyzing this life-shortening problem of wear scars being formed in the control rods, the inventors herein examined the nature of the wear surface interface between the support and the control rod. Typically, the passageway opening in the support is of cylindrical configuration, or a generally circular cross-section, sized somewhat larger than the circular cross-section of the cylindrical control rod which is received therethrough. Each of the channels in the support, which accommodate the vanes which in turn interconnect the control rods with the spider for common movement of the cluster within the rod guide, is defined by corresponding generally parallel interior side walls which form a pair of corresponding junctures with the interior sidewalls defining the passageway opening for the rod. These junctures thus have a convex surface, against which the convex surface segments of the exterior, generally cylindrical sidewall of the rod guide rests as a result of the lateral loading, above noted. As a result, there is a convex-to-convex wear surface interface between the rod guide and the side wall of the passageway opening of the support. For reasons noted in more detail hereafter, this is a very undesirable wear surface interface, contributing to the undersirable, deep wear scar. The mating surface configuration of the convex-to-convex wear surfaces is also significantly less than is desirable from the standpoint of the magnitude of the induced Hertzian contact stresses. The high contact stresses can aggravate the wear condition by causing a change from a normal situation to a semi-galling situation.

The inventors herein therefore recognized the importance of designing an improved wear surface interface between the supports and the control rods that will increase the operational life of the control rods.

To facilitate a better understanding of the structure of a pressure vessel of a type with which the rod supports of the present invention may be employed, and of the environmental conditions which exist therewithin, there is shown in FIG. 1 an elevational, cross-sectional view of a pressurized water reactor with which the rod supports of the present invention may be employed. Further, in FIG. 2, there is shown a plan view of a spider for supporting an array of control rods as a cluster, and, in FIG. 3, an elevational view of a spider, partially in cross-section. FIG. 4 illustrates, in a perspective and broken-away view, a section of a rod guide for accommodating a control rod cluster as shown in FIGS. 2 and 3, a typical, conventional rod guide support being shown in phantom lines and fragmentary section in FIG. 4. Finally, FIG. 5 is a planar view of a section of a support, as shown in FIG. 4, including therewithin, as shown in cross-section, a corresponding control rod.

In FIG. 1, the pressurized water reactor 10 includes a vessel 12 of generally conventional configuration with an upper dome 12a, cylindrical side walls 12b, and a bottom closure 12c. Within the bottom closure 12c, as schematically indicated, is so-called base mounted instrumentation 14. The lower barrel assembly 16 includes a generally cylindrical side wall 17 affixed at its lower and upper ends to respective lower and upper core plates 18 and 19. Fuel rod assemblies 20 are positioned in generally vertically oriented, parallel axial relationship within the lower barrel assembly 16. A radiation reflection shield 21 is mounted interiorly of the cylindrical side wall 17, in conventional fashion.

The inner barrel assembly 24 includes a cylindrical side wall 26 within which is positioned a plurality of rod guides in closely spaced, parallel axial relationship; for simplicity of illustration, only two such rod guides are shown in FIG. 1, namely rod guide 28 housing a cluster of radiation control rods 30 and a rod guide 32 housing a cluster of water displacement rods 34. Mounting means 36 and 37 are provided at the respective upper and lower ends of the rod guide 28 and, correspondingly, mounting means 38 and 39 are provided at the respective upper and lower ends of the rod guide 32, the lower end mounting means 37 and 39 mounting the respective rod guides 28 and 32 to the upper core plate 19, and the upper mounting means 36 and 38 mounting the respective rod guides 28 and 32 to a calandria assembly 50.

The calandria assembly 50 includes a lower calandria plate 52, an upper calandria plate 54, and a plurality of parallel axial calandria tubes 56 which are positioned in alignment with corresponding apertures in the lower and upper calandria plates 52 and 54, and to which the calandria tubes 56 are mounted at their respective opposite ends.

Extending upwardly beyond the upper calandria plate 54 and, more particularly, within the dome 12a of the vessel 12, there is provided a plurality of flow shrouds 60 respectively aligned with the calandria tubes 56. A corresponding plurality of head extensions 62 is aligned with the plurality of flow shrouds 60, with respective adjacent ends thereof in generally overlapping relationship. Radiation control rod cluster displacement mechanisms 64 and water displacement rod cluster displacement mechanisms 66 are associated with the respective head extensions 62, flow shrouds 60 and calandria tubes 56 which, in turn, are respectively associated with the respective clusters of radiation control rods 30 and water displacement rods 34.

Particularly, the radiation control rod cluster and water displacement rod cluster displacement mechanisms 64 and 66 connect through corresponding drive lines to the respective clusters of radiation control rods and water displacement rods 30 and 34, to control the respective vertical positions thereof and, particularly, to selectively lower same through corresponding openings (not shown) provided therefore in the upper core plate 19 into surrounding relationship with respectively associated fuel rod assemblies 20. While the particular control function is not relative to the present invention, in so far as the control over the reaction within the core is affected by the selective positions of the respective rod clusters 30 and 34, it is believed that those skilled in the art will appreciate that moderation, or control, of the reaction is accomplished in accordance with the extent to which the control rod clusters are inserted into the core and with the effective water displacement adjustment which is achieved by selective positioning of the water displacement rods 34.

As shown by the input and output arrows associated with the nozzles in FIG. 1, coolant enters the vessel 10 and proceeds downwardly through the annular chamber between the vessel side wall 12b and the side wall 26 of the inner barrel assembly 24, to enter the region defined by bottom enclosure 12c. It then passes upwardly through the lower barrel assembly 16 and the inner barrel assembly 24, whereafter it turns through 90° within the calandria assembly 50 and thereafter exits from the vessel 10. The flow through the upper internals assembly 24, while primarily axial, is subject to formation of vortices and other turbulence conditions producing lateral loading on the elements within the upper internals 24 and particular on the control rods of the clusters 30 and 34. While the present invention may be employed with both reactor control rods and water displacement control rods as in the clusters 30 and 34, it is described in the following primarily in relation to the control rods which are subject to far more extensive and frequent axial movement for performing the moderation function, before referenced.

FIGS. 2 and 3 respectively show plan and vertical elevational views, the latter partially in cross-section, of a typical control rod cluster 30, including the spider 70 which comprises a central hub 72 and radially extending vanes 74. Each vane 74 includes an intermediate mounting element 76 and a remote mounting element 78, the lower ends of which are suitably configured, such as by threaded bores 76a and 78a, respectively, for receiving and engaging therein the upper ends of corresponding control rods. The hub 72 moreover includes a threaded interior bore 73 for connection to a drive line (not shown) by which the spider and its associated cluster of control rods is raised or lowered within its corresponding rod guide 28, as shown in FIG. 1.

FIG. 4 illustrates in perspective view a segment of a control rod guide 28 within which is disposed, and shown by phantom lines, a conventional support 90. Plural supports 90 are secured within each rod guide 28, typically spaced by approximately 30 inches axially throughout the length of the rod guide 28. The outer perimeter 91 of the support 90 generally conforms to the interior geometric configuration, in cross-section, of the side wall of the guide 28 and is secured thereto by suitable means, such as welding.

The planar view of FIG. 5 illustrates a corresponding segment of a support 90, as shown in FIG. 4, within which there is additionally illustrated, in cross-section, a corresponding control rod 30a. The interior wall surface 92 of the support 90 is generally cylindrical, i.e., a modified circular cylinder, and provides an axially extending passageway opening for the rod 30a. However, the cylindrical surface 92 is interrupted by the clearance channel, or slot 93; with reference to FIGS. 2 and 3, the slot 93 accommodates a vane 74 which connects to an exterior mounting element 78 for the control rod 30a. As will be understood, the support 90 will be configured to include a further passageway opening for the intermediately positioned control rod of the common vane 74 (FIG. 3) which has two such channels or slots 93 on the diametrically opposite sides thereof, thereby to accommodate the portions of the vane 74 extending from either side of the associated mounting element 76.

As before noted, the interior, modified cylindrical surface 92 of the support 90 is sized diametrically, i.e., in cross-sectional area, somewhat larger than the exterior diameter, or cross-sectional area, of the control rod 30a to permit for axial movement; due to the lateral forces caused by the pressure exerted by the circulating coolant, the control rod generally rests in a position off-center of the axis of the passageway opening defined by the generally cylindrical interior surface 92, and, particularly, is disposed against the clearance channel, or slot 93. The interior, spaced side wall surfaces 93a and 93b, which define the channel 93, form corresponding junctures 95a and 95b with the respective contiguous positions of the cylindrical interior side wall surface 92, those junctures defining a convex surface configuration relative to the cylindrical surface segments of the control rod 30a which are loaded against them. The generally cylindrical outer surface of the control rod 30a thus is likewise of convex configuration, relative to the junctures 95a and 95b. The interface between the rod 30a and the support 90 therefore is that of convex-to-convex wear surfaces. Because the support 90 is made of a much harder material than the control rod 30a, the convex wear surfaces of the support 90 at the junctures 95a and 95b produce wear scars, identified at 31a and 31b in FIG. 5, each of a characteristic, wedge-shaped cross-sectional configuration.

Because of the inherent wedge-shaped cross-section of the wear scar which is worn into the rod 30a, it is very deep (i.e., in a radial direction with respect to the rod 30a) relative to the cross-sectional area of the wear scar. As also before noted, the mating wear-surface surface interface of convex-to-convex wear surfaces is undesirable from the standpoint of the magnitude of the induced Hertzian contact stresses which these configurations present. High such stresses aggravate the wear situation, causing a change from a normal wear situation to a semi-galling situation.

The prior art has offered no solution to the problem of the excessive wear condition and related stresses produced by such convex-to-convex wear surfaces in the conventional supports disposed within rod guides for rod clusters, as above described. More specifically, while the problem of wear has been recognized, the solutions proposed in the prior art have not addressed the problem which has been analyzed by the present inventors and discussed above.

For example, U.S. Pat. Nos. 4,562,038 and 4,231,843 relate to reducing control rod wear by decreasing the lateral forces which are exerted upon the control rods, through redirection of the lateral flow. U.S. Pat. No. 4,313,796 discloses a control rod support in which the passageway opening is of a closed, or continuous, polygonal configuration; the support, accordingly, does not incorporate a clearance channel, or a slot, through the support sidewall and communicating with the passageway opening. Thus, the support would not accommodate the cluster and supporting spider with laterally extending vanes, as required in rod guides of the type to which the present invention relates—and, absent any such channels, there is not presented the problem of the wear surface interface at the juncture of the channel and the passageway opening which is addressed by the present invention. U.S. Pat. Nos. 4,326,921, 4,284,475, and 4,584,168 disclose inserts for control rod guide tubes which serve to alter the contact surface between a control rod and an associated support, to change the types of materials which are in contact at the wear surfaces, and to equalize coolant pressure.

Accordingly, the prior art has not offered a solution to the wear problem created by the convex-to-convex wear surface interface addressed by the present invention. Control rod wear and the related cost of replacement of the control rods and, most significantly, the down-time of a nuclear reactor present major expenses for operators of nuclear reactors. Necessarily, loss of the power generating capability requires frequently that surplus electrical power be purchased during the down-time, adding additionally to the maintenance.

Accordingly, there is a serious requirement for improving the wear conditions on the control rods and thereby extending their life and thereby the time between maintenance operations and the resulting down-time of nuclear reactors.

SUMMARY OF THE INVENTION

The present invention presents a unique solution to the problem of the undesirable wear surface interface and deep wedge-shaped wear scars which are encountered in typical designs of rod supports as are shown in FIGS. 4 and 5. Particularly, the invention applies a standard derived from classical Archard Wear Theory, that wear volume is nearly independent of the interface configuration. The invention, moreover, takes into account that a high Hertzian contact stress can have an additional, adverse effect on the wear phenomena and a consequent, adverse effect on the resulting wear volume.

In accordance with the invention, the wear surface of the support at the interface with the surface of the control rod is changed from a convex configuration to a planar configuration. More specifically, in the support in accordance with the invention, there is provided a passageway opening for each corresponding rod guide, and a clearance channel, or slot, extending through the support from the passageway for accommodating the associated vane of a supporting spider. At the juncture of the interior sidewalls of the channel with the interior passageway sidewalls, planar wear surfaces are formed, extending from the juncture to a lateral extent sufficient to result in a uniform, and thus not wedge-shaped, wear scar in the convex and contiguous wear surface segment of the rod. More particularly, the lateral extent of each planar wear surface of the support is geometrically defined as a plane which is perpendicular to a line passing through the axis of the passageway and intersecting the plane at a point of tangency with the segment of the cylindrical of the rod defining its convex wear surface. There thus is provided a planar-to-convex wear surface interface between the rod and its associated support.

BRIEF DESCRIPTION OF THE DRAWINGS

FIG. 6 is a plan view of a section of a support as in FIG. 5, but having planar wear surfaces in accordance with the present invention;

FIG. 7 is a view of a support in accordance with the invention as in FIG. 6, but wherein the passageway is a polygonal cross-sectional configuration.

DETAILED DESCRIPTION OF THE PREFERRED EMBODIMENTS

Figure 1:
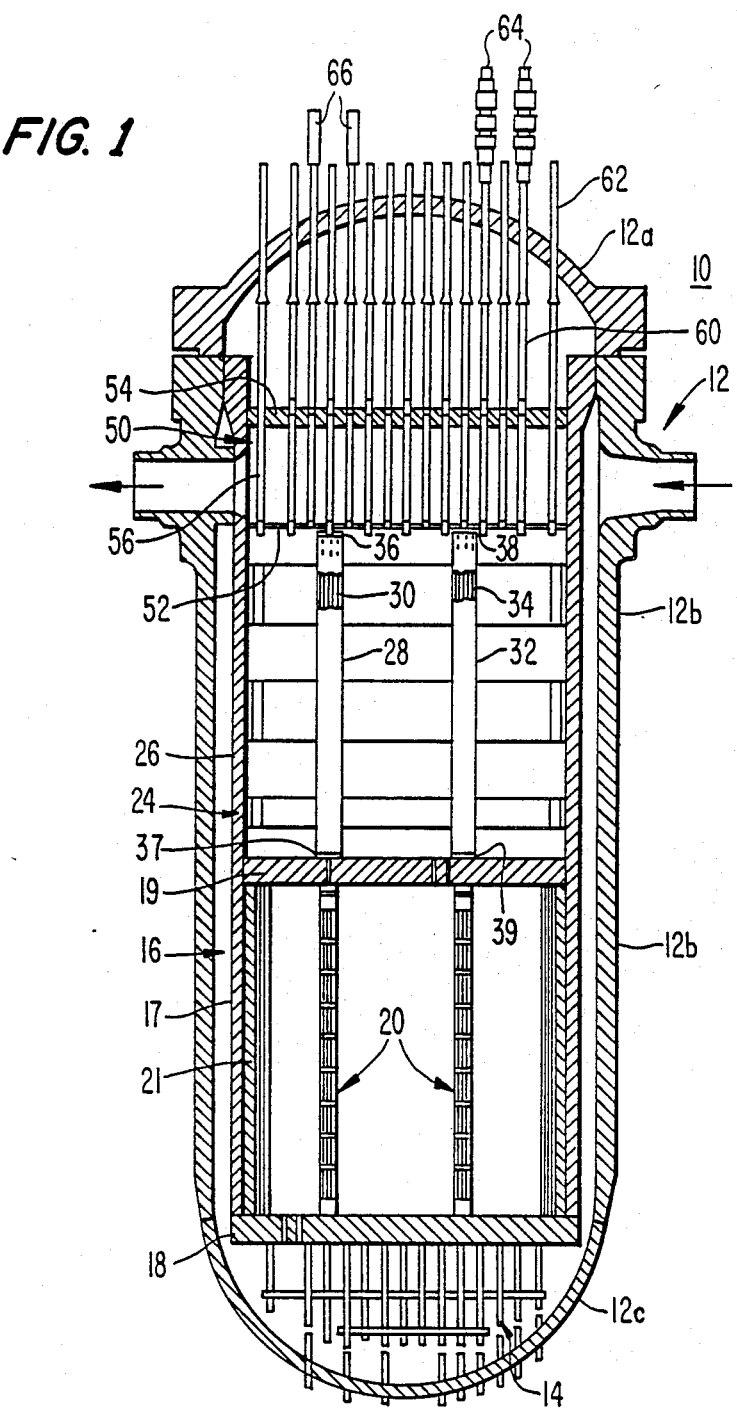
FIG. 1 is an elevational view, partially in cross-section, of a pressurized water reactor vessel of a type in which the control rod supports of the present invention may be employed.
Figure 2:
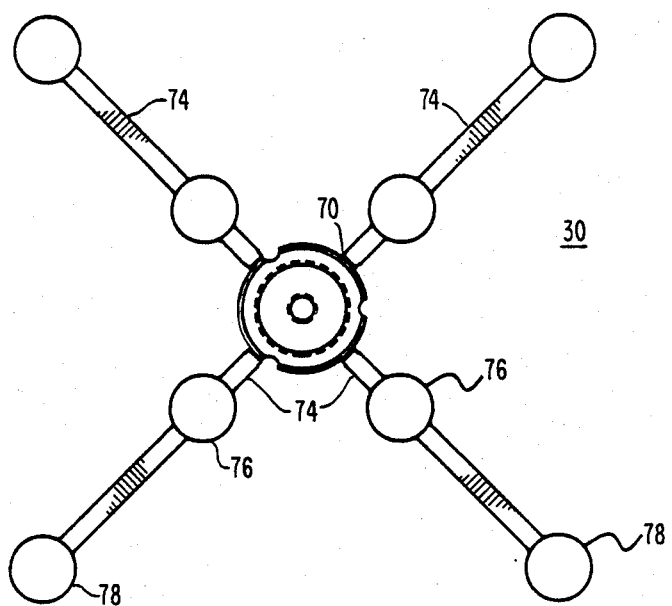
FIGS. 2 and 3 are planar and elevational views, respectively, the latter partially in cross-section, of a spider of conventional type used to support a cluster of control rods.
Figure 3:
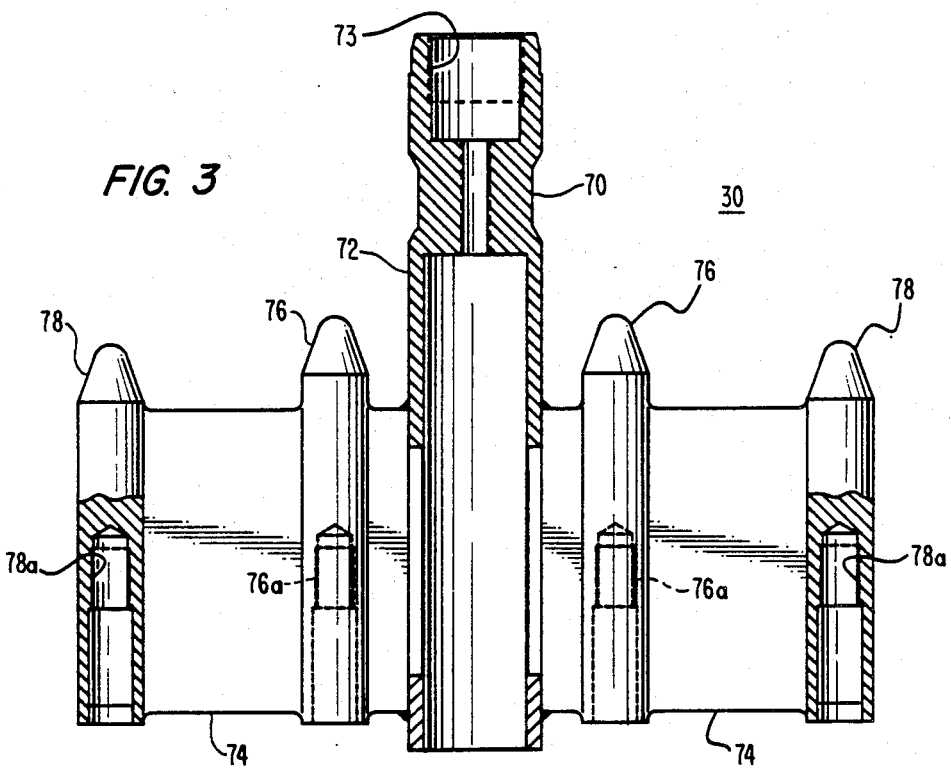

With reference to FIG. 6, the support 100 in accordance with the invention includes a passageway opening for each rod, defined by a generally cylindrical interior side wall surface 102 which is interrupted at one segment by a clearance channel, or slot, 103 bounded by interior, spaced side wall surfaces 103a and 103b of the support 100. In accordance with the invention, planar wear surfaces 105a and 105b are formed, extending at corresponding angles from the junctures of the interior side wall surfaces 103a and 103b of the channel 93 and the passageway opening for a sufficient lateral distance to provide uniform, and thus not wedge-shaped, wears scar 131a and 131b to be formed in the respectively mating, convex and respective wear surfaces of the rod 30a resting thereagainst. The lateral extent of the planar surfaces 105a and 105b is a function of the diameter of the control rod 30a and the corresponding, larger sized diameter of the generally cylindrical, interior side wall surface 102.

It is believed that the optimum relationship is afforded when the following geometric relationship is established. Namely, the plane of the wear surface 105a (or 105b) is to be perpendicular to a line running from the central axis of the generally cylindrical interior side wall 102, that line moreover being spaced at an angle $\phi=40°$ relative to a line extending from that same central axis and bisecting the clearance channel 103. Stated in another manner, each of the wear surfaces 105a and 105b comprises a plane which is parallel to the axis of the generally cylindrical interior side wall 102 of the support 100, the plane being perpendicular to a line drawn from that axis and which intersects the plane at its point of tangency to the (original) cylindrical circumference of the control rod 30a, and which line is spaced at an angle $\phi=40°$ from a second line drawn from that axis and bisecting the channel 103.

Figure 4:
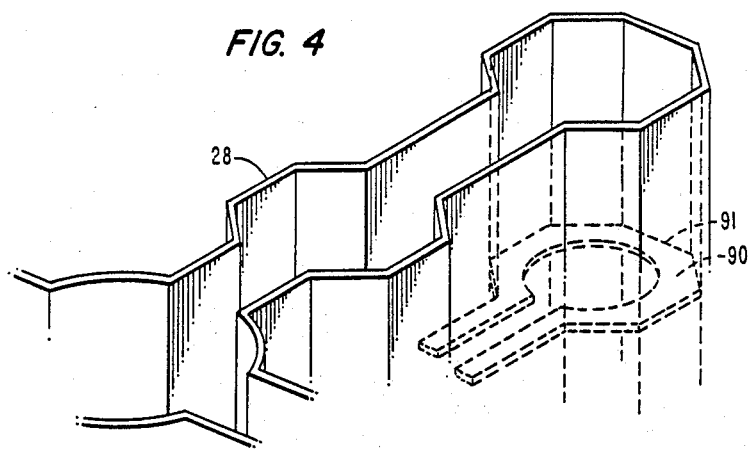
FIG. 4 is a perspective view of a fragmentary section of a rod guide and including, in phantom view, a section of a conventional control rod support.
Figure 5:
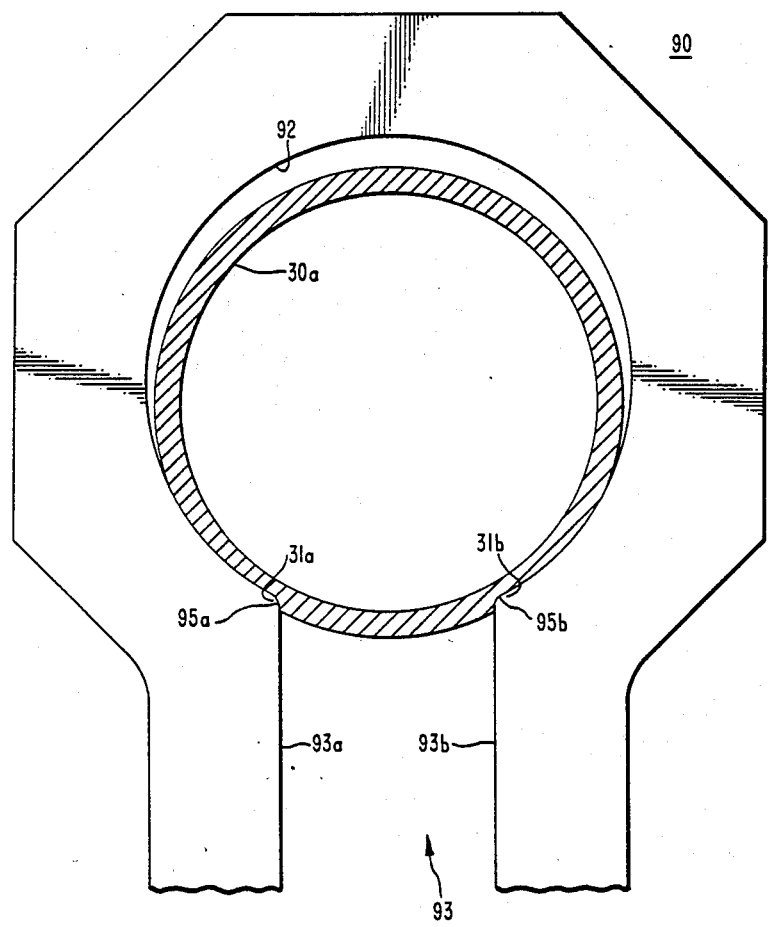
FIG. 5 is a planar view of the section of the control rod support shown in FIG. 4 including, in cross-section, a control rod as received therein and illustrating the wedge-shaped wear scar in the control rod resulting from the convex-to-convex wear surface interface of the rod with the conventional rod support.

By elimination of the convex-to-convex mating wear surfaces of the prior art control rod support 100, the present invention greatly mitigates the magnitude of induced Hertzian contact stresses and thus increases the useful life of each control rod 30a. Hertzian contact stresses are a function of a normal force exerted upon two mating surfaces and are at a maximum level when point-to-point contact is made. Convex-to-convex mating surfaces, as in the prior art configuration of FIGS. 4 and 5, exhibit many characteristics of a point-to-point interface, and thus are subject to unacceptably high stress factors and wear characteristics. By utilization of the planar surfaces 105a and 105b and thus of planar-to-convex mating wear surfaces in accordance with the invention, Hertzian contact stresses are greatly reduced because a greater wear surface area (i.e., that of each of planar surfaces 105a and 105b) is present and, as a result, the normal force is distributed over this greater area. Reduction of Hertzian contact stresses vastly improves the operating characteristics and prolongs the useful life of the control rods 30a. The control rods 30a thus are able to remain in service for a much greater period of time before maintenance, thereby reducing costly down-time for maintenance.

FIG. 7 illustrates a further embodiment of the invention, adopting the same planar view as in FIG. 6. Particularly, the support 110 has an interior sidewall 112 of polygonal cross-section, shown to be a generally octagonal cross-section. Planar wear surfaces 115a and 115b are provided, having the characteristics and being defined in substantially the same manner as the surfaces 105a and 105b in FIG. 6. The benefit afforded by the polygonal cross-section interior side wall 112 is that a greater cross-sectional area is afforded and thus passage of circulating coolant through and about the surface of the control rod 30a and within the support 110 is facilitated. This further reduces the Hertzian stress factors and thus reduces the rate of wear.

Figure 8:
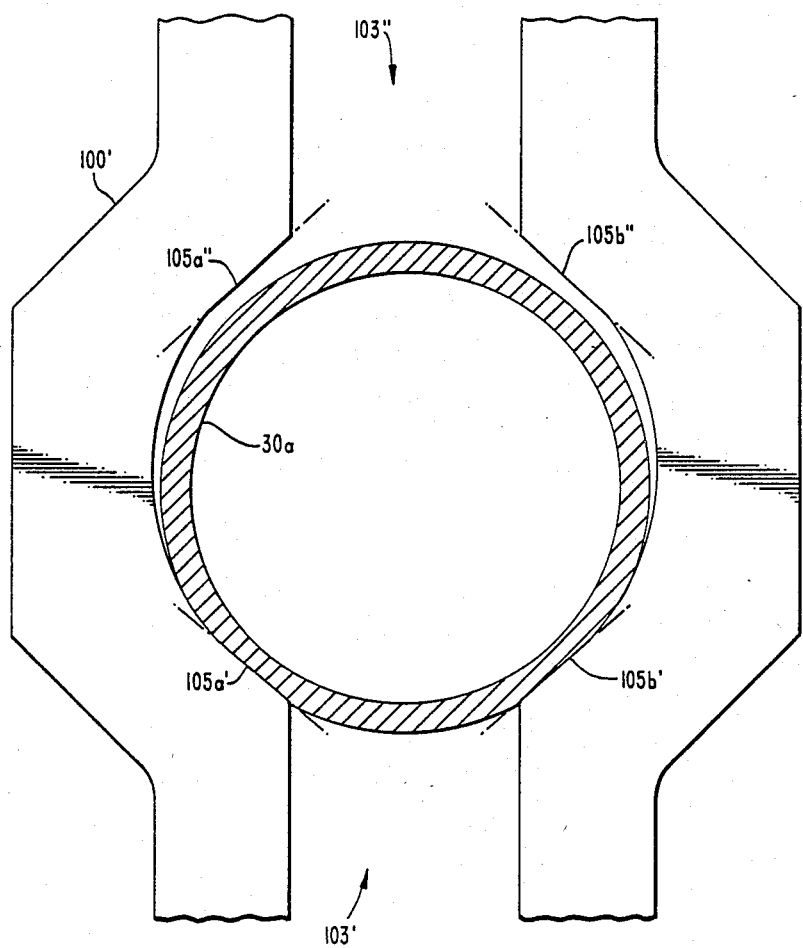
FIG. 8 is a planar view of a section of a support in accordance with the invention, wherein the passageway has a generally cross-sectional configuration as in FIG. 6 but wherein two channels, or slots, extending from the passageway opening and two sets of corresponding planar wear surfaces.

As before noted in relation to FIGS. 1 through 4, the spider vanes include intermediate mounting elements for the correspondingly positioned intermediate control rods. Accordingly, the support must have clearance channels or slots for accommodating the corresponding vane portions. FIG. 8 is a plan view, as in FIGS. 6 and 7, of a section of the support 100 which accommodates such an intermediate-positioned control rod 30a. In FIG. 8, a pair of channels 103' and 103" thus is provided, each corresponding to the channel 103' in the structure of FIG. 6. Corresponding pairs of planar wear surfaces 105a', 105 b' and 105a", 105b" are provided, having the same characteristics as defined for the wear surfaces 105a and 105b in FIG. 6. It will be understood that, whereas the control rod 30a may be predisposed by the normal loading forces to rest against the support 100 adjacent the clearance channel 103", the alternative condition may arise and thus it is appropriate to provide the alternative pair of planar wear surfaces 105a" and 105b". While by traditional configurations, a pair of channels such as 103' and 103" is aligned diametrically as shown, alternative configurations, and which may incorporate more than two such clearance channels, as well are possible.

Control rods supports in accordance with the present invention accordingly provide a significant economic advantage in the operation of nuclear reactors, by extending the useful operating life of the control rods and thus reducing both the cost for replacement of control rods and costly down time. It will be apparent to those skilled in the art that numerous modifications and adaptations of the present invention may be achieved and accordingly it is intended by the appended claims to cover all such modifications and adaptations as fall within the true spirit and scope of the invention.

We claim:

1. A combination, comprising:
   (a) a longitudinally extending rod guide;
   (b) a support for a control rod, said support being positioned within the rod guide and intended to receive and minimize scarring of the control rod;
   (c) a cylindrical control rod having a convex surface and being held by a spider including vanes;
   said support being relatively flat and thin, and having a predetermined exterior cross-sectional configuration and including
      (i) a control rod opening formed in the support and having a predetermined configuration and cross-sectional area,
      (ii) a channel formed in the support to receive one of the vanes and communicate with the control rod opening, said channel forming a respective pair of junctures with the control rod opening;
   the control rod opening including a pair of planar wear surfaces, each parallel to the axis of the control rod opening and extending laterally from the respective junctures to afford a planar-to-convex interface between the convex surface of the control rod and the planar wear surfaces of the support when the convex surface of the control rod abuts said junctures.

2. A support as recited in claim 1, wherein:
   each said planar wear surface is defined by a plane which is perpendicular to a first line intersecting the plane and passing through the axis of the control rod opening, the line forming an angle of approximately 40° with a second line passing through the axis of the control rod opening and bisecting the channel.

3. A support as recited in claim 2, wherein:
   the point of intersection of the plane of each planar wear surface and said first line perpendicular thereto is located at a point of tangency of the convex surface of the control rod when the convex surface of the control rod abuts the corresponding junctures of the channel.

4. A support as recited in claim 1, wherein the remainder of the control rod opening, extending from the planar wear surfaces, is of a substantially cylindrical configuration.

5. A support as recited in claim 1, wherein the remainder of the control rod opening, extending from the planar wear surfaces, is of a polygonal cross-sectional configuration.

6. A support as recited in claim 1, wherein:
the control rod opening is of a substantially octagonal cross-sectional configuration; and
said channel includes a corresponding planar segment of the octagonal cross-sectional configuration of the control rod opening.

7. A support as recited in claim 1, wherein at least a second channel is formed in the support and extends from the control rod opening of the support, at angularly displaced positions relative to the axis of the control rod opening.

8. A support as recited in claim 7, wherein the angularly displaced positions are spaced by 180°.

9. A combination in a pressure vessel, comprising:
(a) plural, longitudinally extending control rod guides for receiving, in parallel axial and telescoping relationship therein, corresponding, plural control rod clusters, each cluster including a spider having a central hub and vanes extending outwardly therefrom and each vane having at least one mounting element for securing thereto an upper end of a corresponding control rod;
(b) means for selectively moving the control rod clusters relative to the control rod guides;
(c) relatively flat and thin supports for the control rods positioned at axially spaced locations within each control rod guide, said supports intended to receive and minimize scarring of the control rods; and
(d) a plurality of cylindrical control rods, each having a convex surface,
each support being planar and having
(i) an exterior cross-sectional configuration corresponding to the interior cross-sectional configuration of the associated control rod guide and adapted for being secured thereto,
(ii) a control rod opening formed in the support and having a configuration and cross-sectional area, sized larger than that of a respective control rod, and
(iii) a channel formed in the support to communicate with the control rod opening in alignment with the spider vane associated with the control rod, to permit axial movement of the associated control rod cluster and spider relative to the control rod guide and associated supports, each said channel forming a respective pair of junctures with the control rod opening, and
the control rod opening including a pair of planar wear surfaces, parallel to the axis of the control rod opening and extending laterally from the respective junctures to afford a planar-to-convex interface between the convex surface of the control rod and the planar wear surfaces of the support when the convex surface of the control rod abuts said junctures.

10. A pressure vessel as recited in claim 9, wherein:
each said planar wear surface is defined by a plane which is perpendicular to a first line intersecting the plane and passing through the axis of the control rod opening, the line forming an angle of approximately 40° with a second line passing through the axis of the control rod opening and bisecting the channel.

11. A pressure vessel as recited in claim 10, wherein:
the point of intersection of the plane of each planar wear surface and said first line perpendicular thereto is located at a point of tangency of the convex surface of the control rod when the convex surface of the control rod abuts the corresponding junctures of the channel.

12. A pressure vessel as recited in claim 9, wherein the remainder of the control rod opening, extending from the planar wear surfaces, is of a substantially cylindrical configuration.

13. A combination as recited in claim 1, wherein the remainder of the control rod opening, extending from the planar wear surfaces, is of a polygonal cross-sectional configuration.

14. A pressure vessel as recited in claim 9, wherein:
the control rod opening is of a substantially octagonal cross-sectional configuration; and
said channel includes a corresponding planar segment of the octagonal cross-sectional configuration of the control rod opening.

15. A combination as recited in claim 1, wherein at least a second channel is formed in the support and extends from the control rod opening of the support, at angularly displaced positions relative to the axis of the control rod opening.

16. A combination as recited in claim 15, wherein the angularly displaced positions are spaced by 180°.

* * * * *